UNITED STATES PATENT OFFICE.

WILLIAM D. PATTEN, OF NEW YORK, N. Y.

INK.

1,035,229.  Specification of Letters Patent.  Patented Aug. 13, 1912.

No Drawing.  Application filed July 1, 1910. Serial No. 569,882.

*To all whom it may concern:*

Be it known that I, WILLIAM D. PATTEN, a citizen of the United States, and a resident of the borough of Manhattan, New York city, State of New York, have invented certain new and useful Improvements in Inks, of which the following is a specification.

This invention relates to a new and useful improvement in inks with particular relation to printing or lithographic inks of that class known as transparent printing or lithographing inks, although the improvement may be used in connection with other printing or lithographing inks than those which are transparent.

Heretofore in connection with the manufacture of printing or lithographing inks of the general class described a certain grade of hydrate of aluminum produced by neutralizing a solution of sulfate of aluminum with an alikali has been largely used because when mixed with linseed varnish the mixture becomes substantially transparent. When hydrate of aluminum is mixed with pigments in combination with linseed varnish it acts as a diluent admitting of the spreading of a given amount of pigment over a greater surface without impairing the quality of the color as would be the case with any substance lacking the quality of hydrate of aluminum of becoming transparent. A mixture of linseed varnish and hydrate of aluminum is also used by printers to reduce the inks used by them when the inks are found to be thick or tacky. One variety of printing or lithographing ink, so called, comprising linseed varnish and hydrate of aluminum is commonly known in the art as "transparent white".

I have discovered that phosphoric acid in chemical combination with aluminum, such as a phosphate of aluminum prepared as hereinafter described, has a greater transparent quality for the purposes described than the commercial hydrate of aluminum. It is therefore superior to hydrate of aluminum for the purpose described and other analogous uses. Phosphate of aluminum prepared as hereinafter described for example, having substantially the same physical qualities as hydrate of aluminum may be substituted for the latter in many of its uses.

In order to more fully describe my invention I shall set forth in the following one means of producing a chemical combination of phosphoric acid and aluminum, although it is obvious that it may be produced in other ways and the principle of my invention is not affected by the manner of producing the same.

I take a mixture of ground phosphate of aluminum rock and carbonate of soda and roast the same to a low red heat in any convenient way. I have found that 3 pounds of carbonate of soda to each pound of $P_2O_5$ in the phosphate of aluminum rock produces a good result. The ground mixture is then dissolved in water forming a solution of aluminate of soda and tribasic phosphate of soda. This solution is then neutralized with monobasic phosphate of soda or a substantially pure phosphoric acid, the amount of monobasic phosphate of soda or phosphoric acid to be added to be determined by the usual test for neutralization. I prefer to use monobasic phosphate of soda because it is cheaper. The addition of the monobasic phosphate of soda, for instance, to the solution described results in the production of dibasic phosphate of soda in solution and a precipitate of a double salt of phosphate of aluminum and soda. A sample of the phosphate of aluminum produced I have found to analyze as follows: $Al_2O_3$, 26.08; $Na_2O$, 12.77; $P_2O_5$, 37.75; $H_2O$ on ignition, 19.20.

Potash may be used in place of the carbonate of soda in the roasting process and acid phosphate of ammonia or acid phosphate of potash may be used instead of monobasic phosphate of soda in the neutralization step of the process. In any case the resultant precipitate has the quality of becoming transparent for the purpose described, even though the chemical compound varies according to the method of preparation and the substances used. Phosphate of aluminum as such or as a double phosphate of aluminum and an alkali may be produced as heretofore stated in other ways well known in the arts and I have selected the method described as the one I prefer because of the purity of the product and the low cost of preparation. I therefore do not limit myself to the use of pure or substantially pure phosphate of aluminum for the purpose described as it may contain more or less soda or other alkali, more or less phosphoric acid, or other chemicals or impurities incidental to its manufacture providing that the resultant product has the quality of becoming transparent to make it useful in the arts for the purpose described. In using the term "phosphoric acid" in the claims I mean to include within such term, a monobasic phosphate of soda, or other suitable alkali, as such is simply phosphoric acid partially neutralized.

What I claim and desire to secure by Letters Patent is:

1. An ink containing an ink vehicle, a pigment and phosphoric acid in chemical combination with aluminum.

2. An ink containing an ink vehicle, a pigment and phosphoric acid in chemical combination with aluminum and an alkali.

3. An ink containing an ink vehicle, a pigment and phosphoric acid in chemical combination with aluminum and soda.

4. An ink containing an ink vehicle, a pigment and the precipitate produced by neutralizing a solution of aluminate of soda with phosphoric acid.

5. An ink containing linseed varnish, a pigment and the precipitate produced by neutralizing a solution of aluminate of soda with phosphoric acid.

6. A "transparent white" ink containing an ink vehicle and phosphoric acid in chemical combination with aluminum.

7. A "transparent white" ink containing an ink vehicle and phosphoric acid in chemical combination with aluminum and an alkali.

8. A "transparent white" ink containing an ink vehicle and phosphoric acid in chemical combination with aluminum and soda.

9. A "transparent white" ink containing an ink vehicle and the precipitate produced by neutralizing a solution of aluminate of soda with phosphoric acid.

10. A "transparent white" ink containing linseed varnish and the precipitate produced by neutralizing a solution of aluminate of soda with phosphoric acid.

In testimony whereof I have signed this specification in the presence of two subscribing witnesses.

WILLIAM D. PATTEN.

Witnesses:
K. G. LEARD,
SEABURY C. MASTICK.